June 24, 1930.   G. S. MAYNARD   1,767,805
STUD FOR SNAP FASTENERS
Filed Jan. 19, 1928

INVENTOR.
George S. Maynard.
By J. H. McCrady,
his Attorney.

Patented June 24, 1930

1,767,805

UNITED STATES PATENT OFFICE

GEORGE S. MAYNARD, OF NEWTONVILLE, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

STUD FOR SNAP FASTENERS

Application filed January 19, 1928. Serial No. 247,354.

This invention relates to fastening devices and more especially to the stud members of snap fasteners.

It is frequently desirable to use snap fasteners under such conditions that the installation of the stud members of the fasteners is facilitated by driving them into flooring, wood work, or the like. The stud of a snap fastener, however, is practically always hollow, and consequently, if it is attempted to drive such a stud with a hammer, or the like, there is great danger of so deforming the head that it will not fit the socket member of the fastener.

The present invention aims to devise a stud construction in which this danger will be obviated, while at the same time avoiding any substantial increase in the expense of manufacture of the stud.

The nature of the invention will be readily understood from the following description when read in connection with the accompanying drawings, and the novel features will be particularly pointed out in the appended claims.

Figure 1:
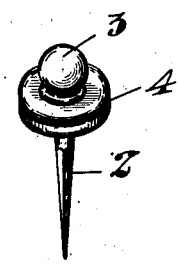
Figure 1 is a perspective view of one form of stud embodying this invention.
Figure 2:
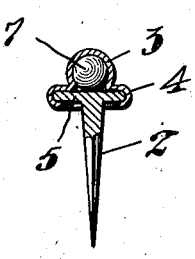
Fig. 2 is a cross-sectional view, partly in elevation, of the stud shown in Fig. 1.
Figure 3:
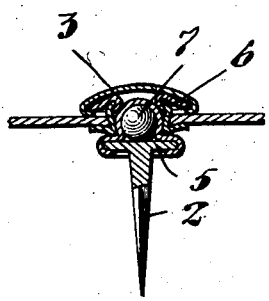
Fig. 3 is a view similar to Fig. 2 but showing the head of the stud located in the socket member.

Referring first to Figs. 1, 2 and 3, the stud there shown comprises a pointed shank member 2 adapted to be driven, and a hollow sheet metal head 3 of approximately the usual form. The shank may consist of a nail or tack, and the head 3 preferably is secured to it by crimping the edge of its flanged base 4 around the edge of the solid head 5 of the shank.

The construction so far described is very similar to that of fasteners heretofore made, the head 3 being adapted to fit into the usual spring socket 6, Fig. 3, of a snap fastener.

According to the present invention the hollow head 3 is internally reinforced by a member which will transmit the force of a blow on it directly to the shank 2. Preferably this reinforcing member consists of a hardened steel ball 7 such as those used for ball bearings. Such balls are relatively inexpensive, are made very accurately, and because they are hardened they form an excellent reinforcement. In assembling the parts the ball is placed in the cupped sheet metal head, the shank 2 is then brought into the proper relationship to this head, and the base 4 of the head is crimped over the part 5 of the shank in the usual manner, thus enclosing the ball permanently in the head 3. It will be obvious from an inspection of Fig. 2 that in driving this stud into wood work, or the like, the top of the head will effectually be supported against distortion by the ball 7, the force of a hammer blow on the head being transmitted through the ball to the pointed shank 2.

The invention thus provides a stud which can be driven with practically no danger of deforming it, and which can be manufactured at only a trifling increase in expense over prior forms of studs designed for the same purpose.

Figure 4:
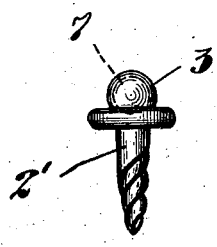
Fig. 4 is a side elevation showing a slightly different embodiment of the invention.

The construction shown in Fig. 4 is substantially like that shown in Figs. 1 and 2 except that the shank 2' has a screw thread of steep pitch so that it can be readily driven into wood or the like, the threads, however, offering increased resistance to the withdrawal of the stud.

Having thus described my invention, what I desire to claim as new is:

1. A snap fastener stud comprising, in combination, an attaching element having a head and a single pointed shank adapted to be drawn into a carrying medium, a hollow sheet metal cap secured to the head of the attaching element and having a head and a neck for cooperative engagement with a snap fastener socket, and a third member located within the hollow cap and normally engaged directly with the head of the attaching element and with the inner surface of the upper end of the stud head provided by the cap, thereby providing means for reinforcing the cap to prevent crushing of the stud head during attachment of the fastener to a carrying medium.

2. A snap fastener stud comprising, a combination, an attaching element having a head and a single pointed shank adapted to be drawn into a carrying medium, a hollow sheet metal cap secured to the head of the attaching element and having a head and a neck for cooperative engagement with a snap fastener socket, and a hardened ball located within the cap, said ball normally contacting with the inner surface of the stud head provided by the cap and resting directly upon the head of the attaching element, thereby providing means for reinforcing the cap to prevent crushing of the stud head during attachment of the fastener to a carrying medium.

3. A stud for snap fasteners comprising a single pointed shank member having a solid head at its upper end, a hollow sheet metal member forming the head of the stud and having a base provided with a margin crimped around the edge of the solid head of said shank, and a solid metal piece resting on the head of said shank member and supporting the top portion of said hollow sheet metal head, whereby the blow of a hammer on the stud to drive it will be transmitted directly through said metal piece to said shank member.

4. A stud for snap fasteners comprising a single pointed shank member having a solid head at its upper end, a hollow sheet metal part forming the head of the stud and having a base provided with a margin crimped around the edge of the solid head of said shank, and a hardened steel ball resting on said solid head and fitting against the upper part of said sheet metal head, whereby the blow of a hammer on the head of the stud to drive it will be transmitted directly through said ball to said shank member.

GEORGE S. MAYNARD.